US011149822B2

(12) United States Patent
Chimner et al.

(10) Patent No.: US 11,149,822 B2
(45) Date of Patent: Oct. 19, 2021

(54) GEAR AXIAL THRUST FORCE OPTIMIZATION FOR HIGH EFFICIENCY VEHICLE TRANSMISSION

(71) Applicant: Eaton Cummins Automated Transmission Technologies LLC, Galesburg, MI (US)

(72) Inventors: Christian Chimner, Royal Oak, MI (US); Thomas J. Stoltz, Allen Park, MI (US)

(73) Assignee: Eaton Cummins Automated Transmission Technologies LLC, Galesburg, MI (US)

( * ) Notice: Subject to any disclaimer, the term of this patent is extended or adjusted under 35 U.S.C. 154(b) by 529 days.

(21) Appl. No.: 16/150,762

(22) Filed: Oct. 3, 2018

(65) Prior Publication Data
US 2019/0032753 A1   Jan. 31, 2019

Related U.S. Application Data

(63) Continuation of application No. PCT/US2017/025666, filed on Apr. 2, 2017.
(Continued)

(51) Int. Cl.
*F16H 3/095* (2006.01)
*B60K 17/06* (2006.01)
(Continued)

(52) U.S. Cl.
CPC .............. *F16H 3/095* (2013.01); *B60K 17/06* (2013.01); *B60K 17/22* (2013.01); *F16C 19/361* (2013.01);
(Continued)

(58) Field of Classification Search
CPC ........ F16H 3/095; F16H 3/097; F16H 37/046; F16H 2003/0931; F16H 2200/0078
See application file for complete search history.

(56) References Cited

U.S. PATENT DOCUMENTS 3,885,446 A * 5/1975 Pengilly .................. F16H 3/095
                                                          74/331
4,922,767 A    5/1990 Toshifumi
(Continued)

FOREIGN PATENT DOCUMENTS

EP        2137431 B1    5/2011
JP        2000266136 A   9/2000

OTHER PUBLICATIONS

International Search Report and Written Opinion for International Application No. PCT/US2017/025666 dated Jul. 10, 2017, 15 pages.

*Primary Examiner* — William C Joyce
(74) *Attorney, Agent, or Firm* — Harness, Dickey & Pierce, P.L.C.

(57) ABSTRACT

A transmission selectively coupled to an engine crankshaft of an internal combustion engine arranged on a vehicle includes an input shaft, a mainshaft, an output shaft, a first countershaft and a second countershaft. A first gear set includes a first mainshaft gear arranged on the mainshaft, a first countershaft gear arranged on the first countershaft and a first countershaft gear arranged on the second countershaft. A second gear set includes a second mainshaft gear arranged on the mainshaft, a first countershaft gear arranged on the second countershaft and a second countershaft gear arranged on the second countershaft. The gears of the first gear set all have a first helix angle. The gears of the second gear set all have a second helix angle. The first and second helix angles
(Continued)

are selected to provide gear constant leading whereby thrust forces directed onto the first and second countershafts are balanced.

14 Claims, 3 Drawing Sheets

Related U.S. Application Data

(60) Provisional application No. 62/317,619, filed on Apr. 3, 2016.

(51) Int. Cl.
*B60K 17/22* (2006.01)
*F16H 3/097* (2006.01)
*F16C 19/36* (2006.01)
*F16D 21/04* (2006.01)
*F16H 37/04* (2006.01)
*F16H 3/093* (2006.01)

(52) U.S. Cl.
CPC ............. *F16D 21/04* (2013.01); *F16H 3/097* (2013.01); *F16D 2500/50607* (2013.01); *F16H 37/046* (2013.01); *F16H 2003/0931* (2013.01); *F16H 2003/0933* (2013.01); *F16H 2200/0078* (2013.01)

(56) References Cited

U.S. PATENT DOCUMENTS

| | | | |
|---|---|---|---|
| 5,447,082 A | 9/1995 | Stine et al. | |
| 7,255,018 B2* | 8/2007 | Gumpoltsberger | F16H 3/089 74/331 |
| 8,100,034 B2* | 1/2012 | Gitt | F16H 37/046 74/745 |
| 2005/0061093 A1 | 3/2005 | Tsberger | |

* cited by examiner

GEAR AXIAL THRUST FORCE OPTIMIZATION FOR HIGH EFFICIENCY VEHICLE TRANSMISSION

CROSS-REFERENCE TO RELATED APPLICATIONS

This application is a continuation of International Application No. PCT/US2017/025666 filed Apr. 2, 2017, which claims priority to U.S. Provisional Application No. 62/317,619 filed on Apr. 3, 2016. The disclosure of the above application is incorporated herein by reference.

FIELD

The present disclosure relates generally to a transmission having an improved bearing configuration and a related method that minimizes bearing frictional losses by reducing the bearing thrust loads that are generated by the gears of the transmission during operation.

BACKGROUND

Conventional automotive vehicle powertrains typically have multiple-ratio transmission mechanisms that establish power delivery paths from an engine to vehicle traction wheels. In order to deliver power efficiently, the transmission gearing must be designed to balance and reduce thrust loads carried by the transmission shaft support bearings. It is also desirable to minimize the axial thrust loads generated by helical gearing to improve overall efficiency of a vehicle transmission.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A transmission selectively coupled to an engine crankshaft of an internal combustion engine arranged on a vehicle includes an input shaft, a mainshaft, an output shaft, a first countershaft and a second countershaft. The first and second countershafts are offset from the mainshaft and drivably connected to the input shaft and the mainshaft. A first gear set includes a first mainshaft gear arranged on the mainshaft, a first countershaft gear arranged on the first countershaft and a first countershaft gear arranged on the second countershaft. The gears of the first gear set are meshingly engaged. A second gear set includes a second mainshaft gear arranged on the mainshaft, a first countershaft gear arranged on the second countershaft and a second countershaft gear arranged on the second countershaft. The gears of the second gear set are meshingly engaged. The gears of the first gear set all have a first helix angle. The gears of the second gear set all have a second helix angle. The first and second helix angles are selected to provide gear constant leading whereby thrust forces directed onto the first and second countershafts are balanced.

According to additional features, the transmission further includes a first and second countershaft bearing that rotatably support the first countershaft. A third and fourth countershaft bearing rotatably support the second countershaft. Axial loads into the first, second, third and fourth bearing are mitigated based on the gear constant leading. The axial loads are less than 10 Newtons. In one configuration the axial loads are zero. At least one of the first, second, third and fourth countershaft bearings comprises a cylinder roller type bearing. In one arrangement, all of the first, second, third and fourth countershaft bearings comprise cylinder roller type bearings.

According to other features, the first mainshaft gear creates a first force. The first countershaft gear of the first countershaft creates a second force. The first countershaft gear of the second countershaft creates a third force. The second and third forces are equal and opposite to the first force. The second mainshaft gear creates a fourth force. The second countershaft gear of the first countershaft creates a fifth force. The second countershaft gear of the second countershaft creates a sixth force. The fifth and sixth forces are equal and opposite to the fourth force. The first force is equivalent to the fourth force.

In other features, the helix hands are elected for gears of the first and second set such that forces generated by the gears are directed toward at least one bearing of the transmission having a reduced slip speed relative to remaining bearings of the transmission. The transmission further includes a first mainshaft bearing, a second mainshaft bearing and a pocket bearing that all support the mainshaft. The pocket bearing is arranged between the first and second mainshaft bearings. Forces generated by the gears are directed toward the pocket bearing while forces experienced at the first and second mainshaft bearings are zero.

A transmission selectively coupled to an engine crankshaft of an internal combustion engine arranged on a vehicle and constructed in accordance to another example of the present disclosure includes an input shaft, a mainshaft, an output shaft, a first countershaft and a second countershaft. The first and second countershafts are offset from the mainshaft and drivably connected to the input shaft and the mainshaft. A first gear set includes a first mainshaft gear arranged on the mainshaft, a first countershaft gear arranged on the first countershaft and a first countershaft gear arranged on the second countershaft. The gears of the first gear set are meshingly engaged. A second gear set includes a second mainshaft gear arranged on the mainshaft, a first countershaft gear arranged on the second countershaft and a second countershaft gear arranged on the second countershaft. The gears of the second gear set are meshingly engaged. A plurality of bearings support the input shaft, the mainshaft, the output shaft, the first countershaft and the second countershaft. Thrust forces directed onto the first and second countershafts are balanced. Gears of the first and second set have helix hands that generate forces directed toward at least one bearing of the plurality of bearings having a reduced slip speed relative to remaining bearings of the plurality of bearings.

According to additional features, the gears of the first gear set all have a first helix angle. The gears of the second gear set all have a second helix angle. The first and second helix angles are selected to provide gear constant leading whereby thrust forces directed onto the first and second countershafts are balanced. The plurality of bearings further comprises a first, second, third, and fourth countershaft bearing. The first and second countershaft bearings rotatably support the first countershaft. The third and fourth countershaft bearing rotatably support the second countershaft. Axial loads on the first, second, third and fourth countershaft bearings are zero. At least one of the first, second, third and fourth countershaft bearings comprises a cylinder roller type bearing.

According to other features, the first mainshaft gear creates a first force. The first countershaft gear of the first countershaft creates a second force. The first countershaft gear of the second countershaft creates a third force. The second and third forces are equal and opposite to the first force. The second mainshaft gear creates a fourth force. The second countershaft gear of the first countershaft creates a fifth force. The second countershaft gear of the second countershaft creates a sixth force. The fifth and sixth forces are equal and opposite to the fourth force. The first force is equivalent to the fourth force. The plurality of bearings further comprises a first mainshaft bearing, a second mainshaft bearing and a pocket bearing that all support the mainshaft. The pocket bearing is arranged between the first and second mainshaft bearings. Forces generated by the gears are directed toward the pocket bearing while forces experienced at the first and second mainshaft bearings are zero.

A method for selecting helical gears in a transmission for minimizing thrust forces within the transmission includes selecting at least two gear sets. Each gear set has a mainshaft gear, a first countershaft gear and a second countershaft gear. Torque transmitting gears of the gear sets are determined for each power path within the transmission. A first helix angle for a first gear set of the at least two gear sets is selected. A second helix angle for a second gear set of the at least two gear sets is determined based on the first helix angle to balance axial forces experienced between the first and second gear sets.

According to additional features, a matrix of linear equations is prepared. The matrix has data related to (Y) a sum of axial forces for the gears of the first gear set, (M) having the tangential force transfer function from helix angle to force, and (X) helix values. The matrix is prepared in the form Y=MX. The second helix angle is determined by solving for X using a linear squares matrix solver.

BRIEF DESCRIPTION OF THE DRAWINGS

The present disclosure will become more fully understood from the detailed description and the accompanying drawings, wherein.

DETAILED DESCRIPTION

Figure 1:
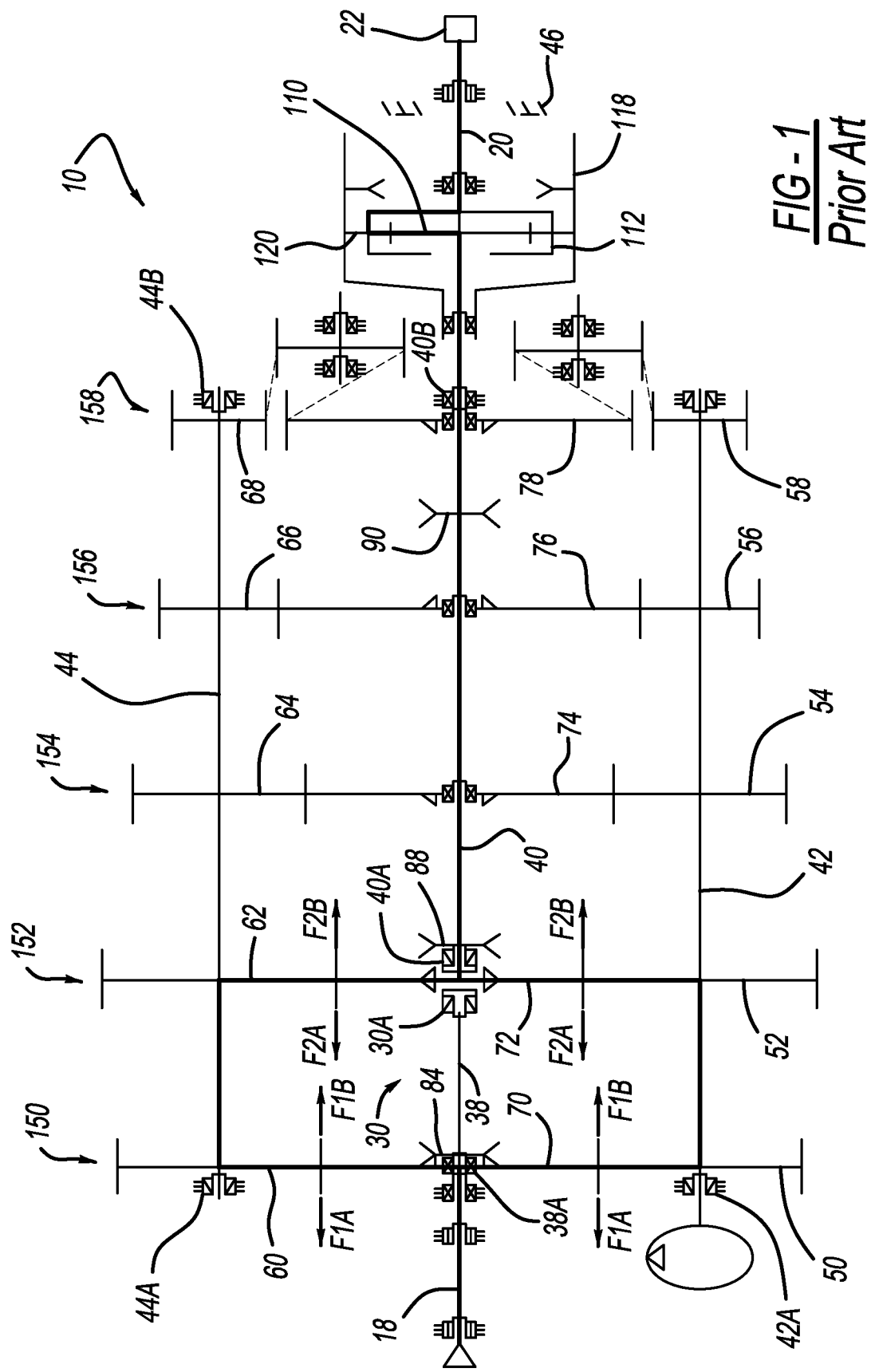
FIG. 1 is a schematic illustration of a transmission constructed in accordance to one Prior Art example.

With initial reference to FIG. 1, a multiple-speed, change-gear transmission constructed in accordance to one example of Prior Art is shown and referred generally to at reference 10. The multiple-speed, change-gear transmission 10 is a heavy duty transmission selectively driven by a fuel-controlled engine (such as a diesel engine or the like, not shown) through an input shaft 18. The multiple-speed, change-gear transmission 10 may be of the compound type comprising a main transmission section connected in series with a splitter and/or range-type auxiliary section. Transmissions of this type, especially as used with heavy duty vehicles, typically have 9, 10, 12, 13, 16 or 18 forward speeds. The particular example used in this disclosure has 12 forward speeds and therefore 12 power paths. A transmission output shaft 20 extends outwardly from the multiple-speed, change-gear transmission 10 and is drivingly connected with vehicle drive axles 22, usually by means of a prop shaft.

The multiple-speed, change-gear transmission 10 has a mainshaft collectively identified at reference 30 and made up of a first mainshaft 38 and a second or intermediate mainshaft 40. The mainshaft 30 is coaxial with the input shaft 18. The transmission 10 has a first countershaft 42 and a second countershaft 44. The countershafts 42 and 44 are offset from the input shaft 18 and the mainshaft 30. The countershafts 42 and 44 are illustrated as being offset from one another, however in some examples the countershafts 42 and 44 may be coaxial with each other. The output shaft 20 may be coaxial with the mainshaft 30.

The first mainshaft 38 is supported for rotation in a housing 46 of the transmission 10 by a first mainshaft bearing 38A. The second mainshaft 40 is supported in the housing 46 of the transmission 10 by a front and rear second mainshaft bearings 40A and 40B. A pocket bearing 30A further supports the mainshaft 30. The first countershaft 42 is supported for rotation by the housing 46 of the transmission 10 by first and second countershaft bearings 42A and 42B. The first countershaft 42 of the transmission 14 has countershaft gears 50, 52, 54, 56 and 58. The second countershaft 44 is supported for rotation by the housing 46 of the transmission 10 by third and fourth countershaft bearings 44A and 44B. The second countershaft 44 of the transmission 10 has countershaft gears 60, 62, 64, 66 and 68. The mainshaft 30 of the transmission 10 has mainshaft gears 70, 72, 74, 76 and 78. A master clutch can selectively communicate torque into the transmission 10. A headset clutch 84, a first sliding dog clutch 88 and a second sliding dog clutch 90 can move left and right as viewed in FIG. 1 to connect various mainshaft gears 70-78 and countershaft gears 50-58 and 60-68 for attaining a desired drive gear and torque path within the transmission 10.

The right hand end of the mainshaft 30 is drivably connected to a sun gear 110. A planetary carrier 112 is connected to or is integral with the output shaft 20, which is connected drivably through the drive axle 22 to vehicle traction wheels. A ring gear 118 engages planet pinions 120 carried by the carrier 112.

As used herein the term "hand" is used to denote a direction that the gear teeth slope on the gear. When looking from the side of the gear, top to bottom is right handed. Bottom to top is left handed. Hand in combination with power flow direction determines thrust direction. The term "helix angle" is used to denote an angle between any helix of a helical gear and an axial line on its right, circular cylinder. As is known, the angle of teeth on helical gears create a thrust load on the gear when they mesh. These trust loads must be accommodated with the bearings identified herein.

As will become appreciated from the following discussion, the present teachings provide a transmission with gears that are optimized with helix angles and hands that minimize thrust forces within the transmission. With thrust forces optimized, bearing losses can be reduced allowing the transmission to incorporate more cost effective bearing options. In general, during operation of the transmission 10, the gears mainshaft gears 70-78 and countershaft gears 50-58 and 60-68 are under load and generate forces that cause the respective shafts 38, 40, 42, 44 to thrust in different directions. These forces are a factor of the helix angles of the respective gears and an amount of torque coming into the gear. According to the present disclosure, helix angles (and the direction they generate axial thrust force) are selected so all of the resulting forces balance out so that a net thrust on any individual shaft is zero.

With the heavy duty transmission 10 shown in FIG. 1, a torque path must travel through at least two gear layers to be communicated from the input shaft 18 to the output shaft 20. The transmission 10 generally has a first gear set 150, a second gear set 152, a third gear set 154, a fourth gear set 156 and a fifth gear set 158. The first gear set 150 can include the mainshaft gear 70, and the countershaft gears 50, 60. The second gear set 152 can include the mainshaft gear 72, and the countershaft gears 52, 62. The third gear set 154 can include the mainshaft gear 74 and the countershaft gears 54, 64. The fourth gear set 156 can include the mainshaft gear 76 and the countershaft gears 56, 66. The fifth gear set 158 can include the mainshaft gear 78 and the countershaft gears 58, 68.

According to the present disclosure a method of optimizing the transmission includes determining which gears are active for given speeds of the transmission. For example, in first gear four gear sets (layers) may be active. In second gear a different four gear layers may be active. A matrix is built that identifies the gears being used for each power path (forward speed) of the transmission. An input torque can be set to a certain condition. Thrust generation can then be determined for each gear depending on which helix angle is used for the gears.

If the gear helix angles and hands are chosen so that axial forces generated by all active gears sum to zero, the transmission has constant lead. To generate a constant lead design, active gears (torque transmitting) are determined for each power paths within the transmission. The direction (fore or aft) of axial thrust forces for the active layers are determined from the gear helix hands, power flow directions, and rotational directions. A systematic method is used to adjust the helix angles for all gear layers until the total net forces on the individual shafts are as close to zero as possible.

Gear thrust forces for any gear within the transmission can be calculated using:

$$Fx = \frac{2*\tau}{d_w} * \tan\beta$$

$F_x$=Axial gear thrust force in [N]. $\tau$=Gear input torque in [Nm]. $d_w$=Gear pitch diameter in [m]. $\beta$=Gear helix angle in [rad].

Helix angles are optimized by arranging the force equations for all of the power paths into a matrix of linear equations in the form of Y=MX. Y is an array that contains the sum of axial forces for the gears with known helix angles. M is a matrix that contains the tangential force transfer function for all of the gears with unknown helix angles. M contains the transfer function from helix angle to force. The tan β is determined by the helix hand and direction of rotation. X is an array of variables that contain the helix information (equal to tan(β)). Once formulated, X can be solved using a linear squares matrix solver to optimize the design. It will be appreciated that a helix angle must be known for one gear and the helix angles for the remaining gears can be solved. The gears in each gear set will have a common helix angle. However, each gear set will not necessarily have the same helix angle as another gear set. For example, if the helix angle is known for the gears in the first gear set 150, the helix angles can be solved for the remaining gear sets.

After solving for X, the helix angles for each unknown gear within the transmission can be calculated by taking the arctan(X). Using this approach, the thrust forces that are generated by the individual gear layers within the transmission can be balanced for all shafts and power paths simultaneously. In some examples, as described herein, where axial forces can be completely eliminated on a shaft, the bearing efficiency can be further improved by changing the shaft support bearings to a more efficient type since there are not axial loads to support on these shafts.

FIG. 1 shows a torque path utilizing the first and second gear sets 150 and 152. Helix angles are arbitrarily chosen for each of the gear sets 150, 152, 154, 156 and 158. A force F1A is created by the mainshaft gear 70. A equal and opposite force F1B is created by the countershaft gears 50, 60. A force F2A is created by the mainshaft gear 72. An equal and opposite force F2B is created by the countershaft gears 52, 62. The forces F1A, F1B are not equal to the forces F2A, F2B. In the example provided F1A and F1B are 2.44 kN whereas F2A and F2B are 3.20 kN.

The input shaft 18 and the output shaft 20 are thrusted toward the outer wall of the transmission 10. In other words, the input shaft 18 is being urged leftward in FIG. 1 while the output shaft 20 is being urged rightward. These loads need to be accommodated by the transmission 10 as a whole and specifically by the bearings 38A and 40B. In the example provided, the force acting on the bearing 38A is 4876N when rotating at 1000 RPM and having a bearing loss of 77.5 W. The force acting on the bearing 40B is 6409 N when rotating at 1306 RPM and having a bearing loss of 111.5 W. The difference between the forces acting on the bearings 38A and 40B is realized at the bearings 42A and 44A. Specifically, bearings 42A and 44B must accommodate a force of 766 N when rotating at 1368 RPM and having a bearing loss of 72.5 W. The bearing 40A accommodates 0 N force when rotating at 306 RPM and has a bearing loss of 0 W. Those skilled in the art will understand that the values given above are merely exemplary and others may be used. As can be appreciated bearing losses are realized throughout the transmission 10.

Figure 2:
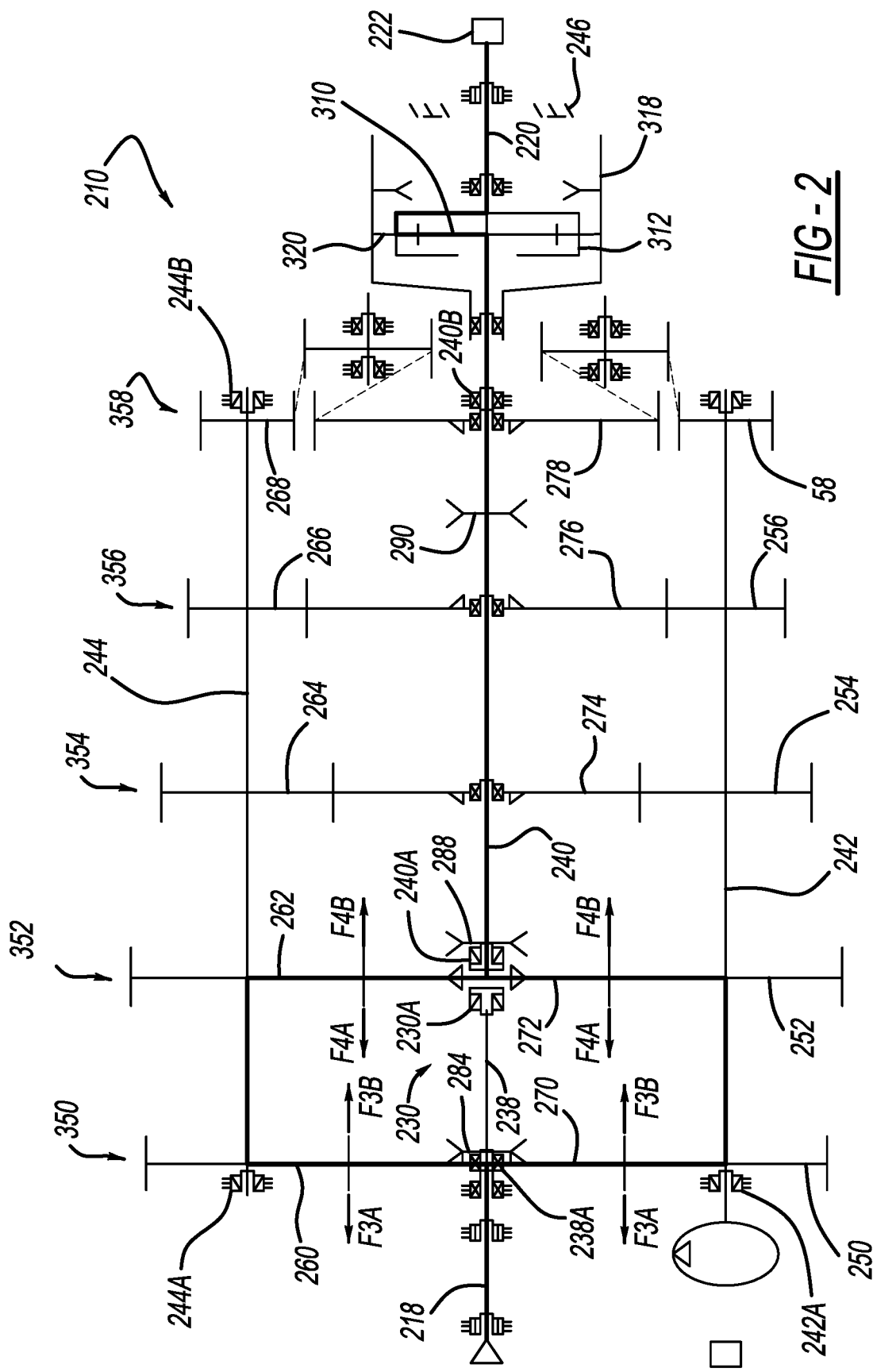
FIG. 2 is a schematic illustration of a transmission constructed in accordance to one example of the present disclosure and having constant leading and LH main shaft helix hands.

Turning now to FIG. 2, a transmission 210 that incorporates constant leading and LH main shaft helix hands according to one example of the present disclosure will be described. The transmission 210 comprises like components of the transmission 10 described above and identified with reference numerals increased by 200. In the transmission 210, shaft thrust forces are minimized through gear constant leading. If the gear helix angles and hands are chosen so that axial forces generated by all active gears sum to zero, the design has constant lead. Forces directed onto the countershafts 242 and 244 are balanced and axial loads are eliminated into the countershaft bearings 242A and 242B. For purposes of this disclosure, eliminated may mean an inconsequential load such as 10 N or less and preferably 0 N.

In the transmission 210, the helix angle for the gears in gear set 350 is adjusted to 25.56 degrees. As a result, the countershaft forces are completely balanced and axial loads are eliminated into the countershaft bearings 242A and 244A. Since the countershaft bearings 242A and 244A no longer are required to support axial loads in the transmission 210, bearings 44A, 44B, 42A and 42B can be changed to more efficient cylinder roller type bearings (as opposed to taper roller bearings required in the transmission 10, FIG. 1). The reduced load in combination with the more efficient bearing type reduces the total bearing losses for the transmission 210 to 315.2 W as compared to 412.6 W for the transmission 10 above.

A force F3A is created by the mainshaft gear 270. A equal and opposite force F3B is created by the countershaft gears 250, 260. A force F4A is created by the mainshaft gear 272. An equal and opposite force F4B is created by the countershaft gears 252, 262. The forces F3A, F3B are equal to the forces F4A, F4B. In the example provided F3A, F3B, F4A and F4B are all 3.20 kN. The force acting on the bearing 238A is 6409N when rotating at 1000 RPM and having a bearing loss of 102.1 W. The force acting on the bearing 240B is 6409 N when rotating at 1306 RPM and having a bearing loss of 111.5 W. The force acting on the bearings 242A and 244A is 0 N when rotating at 1368 RPM and having a bearing loss of 26.4 W.

Figure 3:
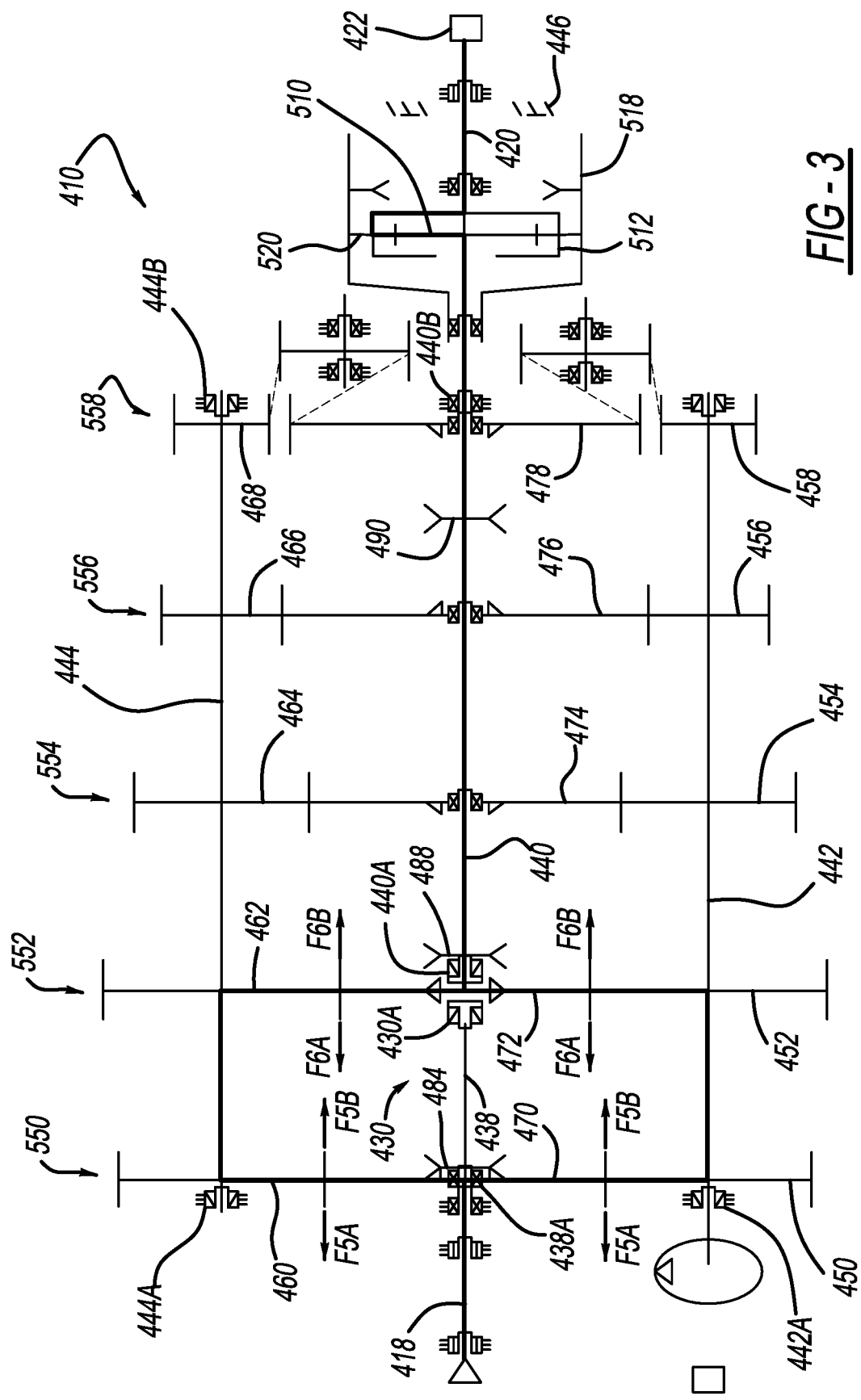
FIG. 3 is a schematic illustration of a transmission constructed in accordance to another example of the present disclosure and having constant leading and RH main shaft helix hands.

Turning now to FIG. 3, a transmission 410 that incorporates constant leading and RH main shaft helix hands according to one example of the present disclosure will be described. The transmission 410 comprises like components of the transmission 10 described above and identified with reference numerals increased by 400. In the transmission 410, gear helix hands are changed (LH to RH) such that the forces generated by the gears are directed toward bearings that have lower slip speeds. Bearing power loss is reduced since the losses are a function of the differential rotation speed between inner and outer races of the bearing in combination with the load.

Returning to the transmission 210 (FIG. 2), the mainshaft bearings 284 and 240B that carry the mainshaft axial load have high slip speeds since their outer races are attached to ground and their inner races are attached to the shafts. The pocket bearing 240A that separates the two main shafts 238 and 240 has a much lower delta speed. Therefore, it is able to carry the load more efficiently.

Referring again to the transmission 410 (FIG. 3), the mainshaft gear helix hands are switched from LH to RH. The axial loads are removed from the bearing 484 and 440B. All of the mainshaft axial forces are directed toward the pocket bearing 440A. Since the slip speed of the bearing 430A (300 RPM) is lower than the slip speeds of the bearing 484 (1000 RPM) and bearing 440B (1306 RPM) the total power loss is reduced if the coefficients of friction are similar for all three bearings. When comparing a power loss of bearing 430A (53.0 W) in the transmission 410 with the power loss of bearing 238A (102.1 W) and bearing 240B (115.5 W) in the transmission 210, the overall power loss for the three bearings 430A, 438A and 440B. Since the two gear sets 550 and 552 generate equal and opposite axial forces due to the constant leading (F5A, F5B, F6A and F6B are equal), no axial force needs to be carried by bearing 438A or bearing 430A and the countershaft bearing axial loads remain 0 N. In the configuration of the transmission 410, a total reduction in bearing power loss over the transmission 10 is 61.8% (412.6 W compared to 157.7 W).

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A transmission selectively coupled to an engine crankshaft of an internal combustion engine arranged on a vehicle, the transmission system comprising:
   an input shaft, a mainshaft, an output shaft, a first countershaft and a second countershaft, the first and second countershafts being offset from the mainshaft and drivably connected to the input shaft and the mainshaft;
   a first gear set having a first mainshaft gear arranged on the mainshaft, a first countershaft gear arranged on the first countershaft and a first countershaft gear arranged on the second countershaft, wherein the gears of the first gear set are meshingly engaged;
   a second gear set having a second mainshaft gear arranged on the mainshaft, a second countershaft gear arranged on the first countershaft and a second countershaft gear arranged on the second countershaft, wherein the gears of the second gear set are meshingly engaged; and
   wherein the gears of the first gear set all have a first helix angle and the gears of the second gear set all have a second helix angle, wherein the first and second helix angles are selected to provide gear constant leading whereby thrust forces directed onto the first and second countershafts are balanced;
   wherein the first mainshaft gear creates a first force, the first countershaft gear of the first countershaft creates a second force, the first countershaft gear of the second countershaft creates a third force, wherein the second and third forces are equal and opposite to the first force;
   wherein the second mainshaft gear creates a fourth force, the second countershaft gear of the first countershaft creates a fifth force, the second countershaft gear of the second countershaft creates a sixth force, wherein the fifth and sixth forces are equal and opposite to the fourth force; and
   wherein the first force is equivalent to the fourth force, wherein helix hands are selected for gears of the first and second set such that forces generated by the gears are directed toward at least one bearing of the transmission having a reduced slip speed relative to remaining bearings of the transmission.

2. The transmission of claim 1, further comprising:
   a first and second countershaft bearing that rotatably support the first countershaft; and
   a third and fourth countershaft bearing that rotatably support the second countershaft.

3. The transmission of claim 2 wherein axial loads into the first, second, third and fourth bearing are mitigated based on the gear constant leading.

4. The transmission of claim 3 wherein the axial loads are less than 10 Newtons.

5. The transmission of claim 4 wherein the axial loads are zero.

6. The transmission of claim 2 wherein at least one of the first, second, third and fourth countershaft bearings comprises a cylinder roller bearing.

7. The transmission of claim 6 wherein all of the first, second, third and fourth countershaft bearings comprise cylinder roller bearings.

8. The transmission of claim 1, further comprising a first mainshaft bearing, a second mainshaft bearing and a pocket bearing that all support the mainshaft, wherein the pocket bearing is arranged between the first and second mainshaft bearings and forces generated by the gears are directed toward the pocket bearing while forces experienced at the first and second mainshaft bearings are zero.

9. A transmission selectively coupled to an engine crankshaft of an internal combustion engine arranged on a vehicle, the transmission system comprising:
   an input shaft, a mainshaft, an output shaft, a first countershaft and a second countershaft, countershaft offset from the input shaft, the countershaft drivably connected to the first input shaft and the mainshaft;
   a first gear set having a first mainshaft gear arranged on the mainshaft, a first countershaft gear arranged on the first countershaft and a first countershaft gear arranged on the second countershaft, wherein the gears of the first gear set are meshingly engaged;
   a second gear set having a second mainshaft gear arranged on the mainshaft, a second countershaft gear arranged on the first countershaft and a second countershaft gear arranged on the second countershaft, wherein the gears of the second gear set are meshingly engaged;
   a plurality of bearings that support the input shaft, mainshaft, output shaft, first countershaft and second countershaft; and
   wherein thrust forces directed onto the first and second countershafts are balanced and gears of the first and second set have helix hands that generate forces directed toward at least one bearing of the plurality of bearings having a reduced slip speed relative to remaining bearings of the plurality of bearings.

10. The transmission of claim 9 wherein gears of the first gear set all have a first helix angle and the gears of the second gear set all have a second helix angle, wherein the first and second helix angles are selected to provide gear constant leading whereby thrust forces directed onto the first and second countershafts are balanced.

11. The transmission of claim 10, wherein the plurality of bearings further comprises:
   a first and second countershaft bearing that rotatably support the first countershaft; and
   a third and fourth countershaft bearing that rotatably support the second countershaft;
   wherein the axial loads on the first, second, third and fourth countershaft bearings are zero.

12. The transmission of claim 11 wherein at least one of the first, second, third and fourth countershaft bearings comprises a cylinder roller bearing.

13. The transmission of claim 11 wherein the plurality of bearings further comprises a first mainshaft bearing, a second mainshaft bearing and a pocket bearing that all support the mainshaft, wherein the pocket bearing is arranged between the first and second mainshaft bearings and forces generated by the gears are directed toward the pocket bearing while forces experienced at the first and second mainshaft bearings are zero.

14. The transmission of claim 9 wherein:
   the first mainshaft gear creates a first force, the first countershaft gear of the first countershaft creates a second force, the first countershaft gear of the second countershaft creates a third force, wherein the second and third forces are equal and opposite to the first force;
   the second mainshaft gear creates a fourth force, the second countershaft gear of the first countershaft creates a fifth force, the second countershaft gear of the second countershaft creates a sixth force, wherein the fifth and sixth forces are equal and opposite to the fourth force; and
   wherein the first force equals the fourth force.

* * * * *